United States Patent [19]

Fang

[11] Patent Number: 5,757,856
[45] Date of Patent: May 26, 1998

[54] DIFFERENTIAL CODER AND DECODER FOR PRAGMATIC APPROACH TRELLIS-CODED 8-PSK MODULATION

[75] Inventor: Juing Fang, Cergy, France

[73] Assignee: Alcatel N.V., Rijswijk, Netherlands

[21] Appl. No.: 556,134

[22] Filed: Nov. 9, 1995

[51] Int. Cl.⁶ .................. H04L 5/12; H04L 23/02
[52] U.S. Cl. .......... 375/265; 375/280; 375/283; 375/308; 375/331; 375/332; 375/341; 371/43
[58] Field of Search .................. 375/265, 280, 375/283, 244, 308, 329, 330, 331, 332, 341; 341/51, 52, 55, 76; 371/43

[56] References Cited

U.S. PATENT DOCUMENTS

| | | | |
|---|---|---|---|
| 5,233,630 | 8/1993 | Wolf | 375/308 |
| 5,428,631 | 6/1995 | Zehavi | 371/43 |
| 5,457,705 | 10/1995 | Todoroki | 371/43 |

OTHER PUBLICATIONS

Pietrobon et al, "Trellis–coded multidimensional phase modulation", *IEEE Transactions on Information Theory*, vol. 36, No. 1, Jan. 1990, New York, US, pp. 63–89.

Zhu and Clark, "Rotationally invariant coded PSK signals", *IEE Proceedings, F. Communications, Radar & Signal Processing*, vol. 134, No. 1 Feb. 1989, Stevenage GB, pp. 43–52.

Henkel, "Phase–invariant coded phase shift keying using Reed–Muller codes", *Archiv fur Elektronik und Ubertragunstechnik*, vol. 46, Vo. 3, May 1992, Stuttgart de, pp. 125–130.

Primary Examiner—Don N. Vo
Attorney, Agent, or Firm—Sughrue, Mion, Zinn, Macpeak & Seas, PLLC

[57] ABSTRACT

The invention relates to an 8-PSK differential coder for trellis-coded modulation and to a corresponding pragmatic decoder, enabling 90°, 180°, and 270° phase ambiguities to be lifted. The invention applies in particular to transmitting images at high rate by radio link.

7 Claims, 3 Drawing Sheets ial coder and decoder for pragmatic approach trellis-coded 8-psk modulation

BACKGROUND OF THE INVENTION

The field of the invention is that of systems for transmitting signals modulated by phase shifting, and more particularly with eight phase states (8-PSK for "eight-state phase shift keying"). More precisely, the present invention relates to a coder and to a decoder for an eight-phasestate modulated signal, the coder and decoder being situated respectively in a transmitter and in a receiver for digital data. A preferred application of the invention is transmitting images over a high data rate radio link.

The advantage of 8-PSK modulation is that it enables data to be transmitted at a high rate without amplitude distortion. As shown by the 8-PSK constellation of FIG. 1, each coded symbol to be transmitted is situated on a circle of unit radius and is encoded on three bits.

A "mapping" table defines the phase shift for a transmitted carrier as a function of the three bits coding each symbol. The following table shows the phase shift $\Phi$ in degrees of the carrier as a function of the value of these bits:

| Bits | 000 | 001 | 011 | 010 | 100 | 101 | 111 | 110 |
|---|---|---|---|---|---|---|---|---|
| $\Phi(°)$ | 22½ | 67½ | 112½ | 157½ | 202½ | 247½ | 292½ | 337½ |

A known problem with such transmission systems is that the transmitted modulated carrier is affected by unwanted phase rotation which, at the receiver, means that the constellation is rotated and the decoded symbols no longer correspond to those which were transmitted. A problem having the same repercussions and referred to as "cycle skipping" takes place when the carrier recovery loop in the receiver is not fast enough to correct the phase of a local oscillator so that it does indeed correspond to the phase of the received carrier.

To remedy that drawback, it is known to perform differential coding at the transmitter so as to be able to correct the received symbols in the receiver independently of rotation of the constellation.

The coding considered in the present invention is trellis-coded modulation (TCM). Trellis coding consists in adding redundant bits to the transmitted signal. This makes it possible at the decoder to correct for any error that may occur on a transmitted bit, whether coded or otherwise. In pragmatic decoding as defined below, this is done in a manner that differs from convolutional coding in that on decoding the received symbols are partitioned into pairs of opposite sectors, each pair being called a "subset". The wrongly-received code bits are corrected by convolutional coding and the non-coded bits are corrected by maximum likelihood decoding and by subset partitioning.

As shown in FIG. 2, 8-PSK trellis coding consists, conventionally, in applying to the input of a convolutional coder G=(171, 133) one of the two bits (representative of an information symbol) that is to be transmitted to a receiver, where G is the octal representation of coding polynomials. The coder has two summing circuits and six delay cells, each of unit symbol time $T_r$. The information symbol bit being subjected to coding is written $B_0$, with bit $B_1$, not being coded. The coder delivers two output bits (coding ratio equal to ½), which bits are written $b_0$ and $b_1$, with bit $B_1$ being renamed $b_2$. The bits $b_0$ and $b_1$ are the two less significant bits of the symbol to be transmitted. A mapping unit receiving the bits $b_0$ to $b_2$ changes their values so that two adjacent phases in the constellation of FIG. 1 differ by a single bit in the range of bit $b_0$ to $b_1$. The mapping table then delivers two bits on quadrature paths to an 8-PSK modulator. The problem posed by such trellis coding for 8-PSK modulation is that the convolutional coder with G=(171, 133) and its Viterbi decoder are transparent to phase rotations of 90°, 180°, and 270°.

Qualcomm Incorporated produces an integrated circuit under the reference Q1875 which is a pragmatic approach decoder of trellis-coded signals. This circuit is described in Qualcomm's "Q1875 Pragmatic Trellis Decoder, 0.8, 7.5, 30, 60 Mpbs Data Rates, Technical Sheet, May 1993". The term "pragmatic" is applied to decoding that does not seek to reconstruct an optimal scheme for modulation and coding, but which provides decoding that is close in performance while remaining simpler to implement. The circuit also serves to perform 8-PSK trellis encoding and can therefore be used both on transmission and on reception.

The coder circuit using the Q1875 integrated circuit comprises means enabling 90°, 180°, and 270° phase ambiguities to be eliminated, but 45°, 135°, 225°, and 315° ambiguities cannot be eliminated. Even so, the means used are complex since they comprise two processing paths, a demultiplexer, a multiplexer, three differential coders, and a convolutional coder such as that shown in FIG. 2.

SUMMARY OF THE INVENTION

The purpose of the present invention is to provide a coder that is simpler to implement than that described in the above-specified publication, together with a corresponding decoder.

This object, together with others that appear below, is achieved by a differential coder/decoder system for trellis-coded 8-PSK modulation, said coding system being of the type designed, at each symbol time, to convert a two-bit information symbol $B_1B_0$ into a three-bit coded symbol $b_2b_1b_0$, said system including a one-input differential coder receiving, at each symbol time, a first of the bits of said information symbol and supplying, at each symbol time, a differentially coded bit to a convolutional coder of the G=(171, 133) type having a ratio of ½ and a constraint length of 7, which delivers two coded bits of said coded symbol, said system being characterized in that it further includes a two-input differential coder receiving one of said bits from said convolutional coder on a first of its inputs and the second of the bits of said information symbol on a second of its inputs, said two-input differential coder providing, at each symbol time, an output bit constituting the third of the bits of said coded symbol, said third bit being equal to:

$$b_2 = B_1 \oplus Db_2 \oplus (\overline{b_1} \cdot Db_1)$$

where $b_2$ is said output bit from said two-input differential coder, $B_1$ is the second of the bits of said information symbol, D is a one symbol time delay, and $b_1$ is said bit applied to said first of the inputs of said two-input differential coder, said one-input differential coder providing a differentially coded bit $B_0'$ equal to:

$$B_0' = B_0 \oplus DB_0'$$

where $B_0$ is said first bit of said information symbol. A corresponding decoder system includes firstly a one-input differential decoder receiving said differentially coded bit and providing said first bit of said information symbol in application of the relationship:

$$B_0 = B_0' \oplus DB_0'$$

and secondly a two-input differential decoder receiving said bits $b_1$ and $b_2$ of said coded symbol and providing said second bit of said information symbol in application of the relationship:

$$B_1 = b_2 \oplus Db_2 \oplus (\overline{b_1} * Db_1)$$

Advantageously, said decoding system includes a subset decoder followed by a Viterbi decoder and by a demapping unit designed to lift the ambiguity on the subset in which the received symbol lies, said Viterbi decoder providing said differentially coded bit to said one-input differential decoder, said Viterbi decoder being connected to a convolutional coder of the G=(171, 133) type having a ratio of ½ and a constraint length of 7 which provides two reconstituted coded bits of said coded symbol to said demapping unit.

BRIEF DESCRIPTION OF THE DRAWINGS

Other characteristics and advantages appear on reading the following description of a preferred embodiment of the invention, given as a non-limiting illustration, and from the accompanying drawings, in which:

FIGS. 1 and 2 are described above with reference to the state of the art.

The following notation is used below in the present description:

each information symbol to be coded and transmitted is constituted by two bits $B_1 B_0$;

each coded symbol is represented by three bits $b_2 b_1 b_0$ where $b_0$, $b_1$, and $b_2 \in \{0,1\}$. The coded symbols are transformed into two digital trains I and Q applied to an 8-PSK modulator for transmission.

DESCRIPTION OF A PREFERRED EMBODIMENT

Figure 1:
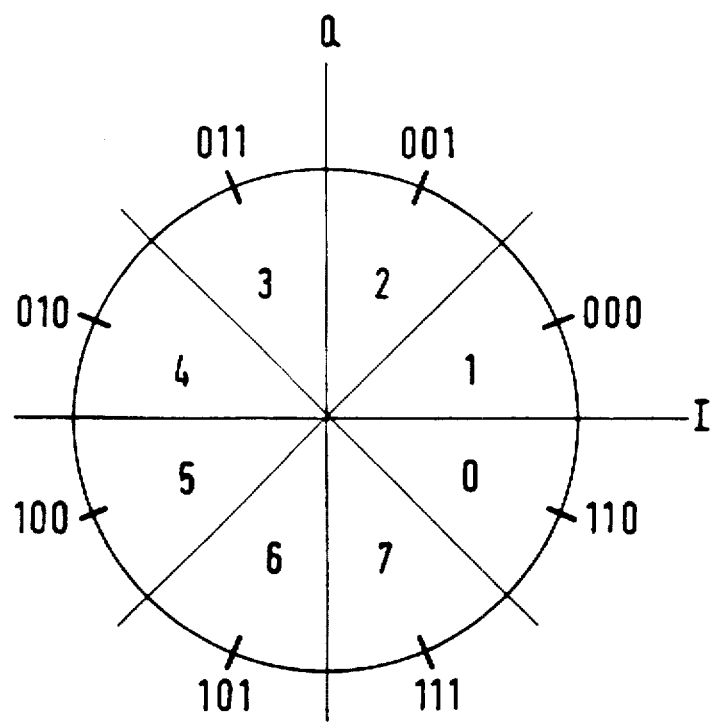
FIG. 1 shows an 8-PSK type coded signal constellation.

The invention is based on the observation that rotations of the FIG. 1 constellation through angles of 90°, 180°, and −90° can be defined by the following equations in which $\oplus$ corresponds to the "exclusive-OR" operation, $+^4$ to modulo 4 addition, and $-^4$ to modulo 4 subtraction:

90° rotation $(b_2)^{90°} = b_2 \oplus b_1$, $(b_1)^{90°} = b_1 \oplus 1$, and $(b_0)^{90°} = b_0 \oplus 1$, where $(b_2)^{90°}$, $(b_1)^{90°}$, $(b_0)^{90°}$ correspond to the three bits of the coded symbol being subjected to rotation through 90°.

These three equations can be summarized by the following two equations:

$$(b_2 b_1)^{90°} = (b_2 b_1) +^4 (0,1)$$

and $$(b_0)^{90°} = b_0 \oplus 1$$

180° rotation $(b_2)^{180°} = b_2 \oplus 1$, $(b_1)^{180°} = b_1$, and $(b_0)^{180°} = b_0$ or in two-dimensional form:

$$(b_2 b_1)^{180°} = (b_2 b_1) +^4 (1,0)$$

−90° rotation $(b_1)^{-90°} = b_2 \oplus 1$, $(b_0)^{-90°} = b_1 \oplus 1$, and $(b_2)^{-90°} = b_2 \oplus 1$.

These three equations can be summed up in two equations:

$$(b_0)^{-90°} = (b_0) \oplus 1$$

and $$(b_2 b_1)^{-90°} = (b_2 b_1) -^4 (0,1)$$

In all of the above equations, a pair (a,b) is a binary representation of a decimal integer equal to 2a+b. Thus, (0,0)=0, (0,1)=1, (1,0)=2, and (1,1)=3.

These equations thus characterize rotations of the constellation for phase shifts of ±90° and 180°. It may be observed in passing that the bits $b_0$ and $b_1$ are interchangeable for the constellation rotation equations.

It is observed that constellation rotations give rise in the equations to addition or subtraction of a constant. Thus, two-dimensional differential coding/decoding can eliminate such phase rotations.

Figure 3:
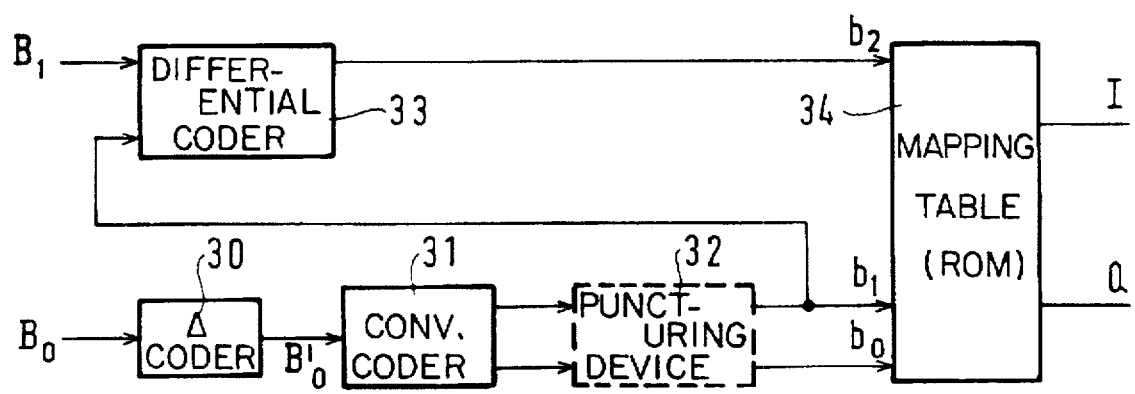
FIG. 3 is a block diagram of a coding system of the invention.

FIG. 3 is a block diagram of a coding system of the invention applying these various coding equations to an information symbol for transmission to a receiver via a radio link.

Figure 2:
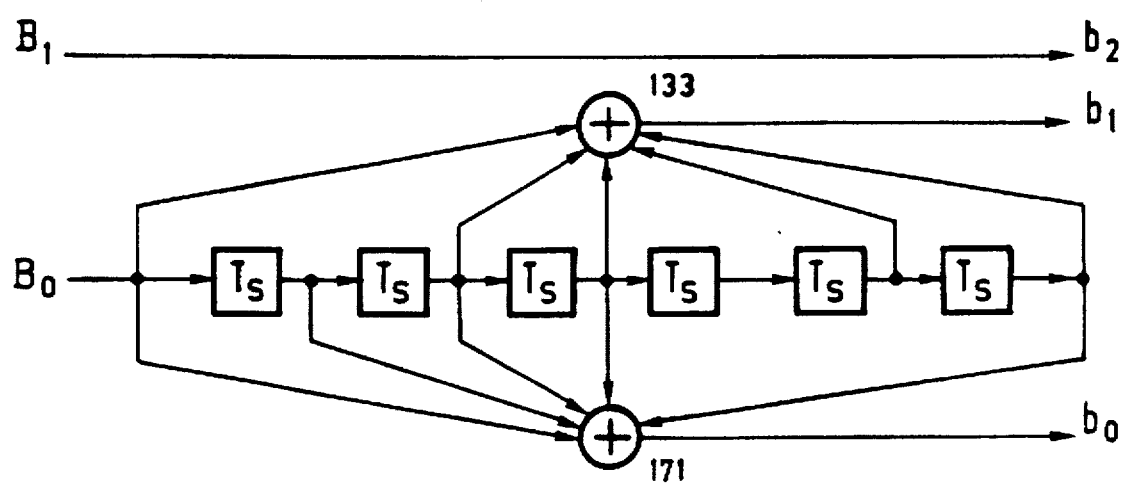
FIG. 2 shows a G=(171, 133) type convolutional coder having a ½ ratio and a constraint length of 7.

Each information symbol to be coded is constituted by two bits $B_1$ and $B_0$, where $B_1$ is the more significant bit (MSB), for example. These information symbols arrive at a symbol rate $T_s$. The bit $B_0$ is applied to a one-input differential coder 30 which provides a bit $B_0'$ at each symbol time. The coder 30 is followed by a convolutional coder 31 of the type G=(171, 133) having a ratio of ½ and having a constraint length of 7, providing two code bits $b_1$ and $b_0$ of the output word. The convolutional coder is identical to that shown in FIG. 2. The convolutional coder 31 is optionally followed by a puncturing device 32, with the invention being equally applicable to punctured and to non-punctured codes. The device 32 is drawn in dashed lines because it is optional. Its purpose is to change coding efficiency by puncturing coded symbols.

The coding system also includes a two-input differential coder 33 receiving the bit $b_1$ from the convolutional coder 31 on a first of its inputs, and the bit $B_1$ of the information symbol on a second of its inputs. At each symbol time, the differential coder 33 provides an output bit $b_2$ constituting the most significant bit of the coded symbol. The bits $b_0$, $b_1$, and $b_2$ are applied to a mapping table 34 constituted by a read-only memory, and having outputs that constitute the in-phase path I and the quadrature path Q. These two paths are subsequently applied to an 8-PSK modulator (not shown).

Figure 4:
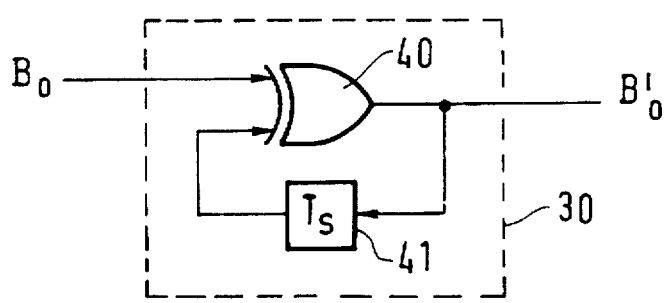
FIG. 4 shows an embodiment of the one-input differential coder of FIG. 3.

FIG. 4 shows an embodiment of the one-input differential coder 30 of FIG. 3. The coder 30 comprises an exclusive-OR gate 40 having one input that receives the bit $B_0$ and having its other input looped back from its output via a bistable (flip flop) 41 that is controlled at the symbol rate $T_s$. Thus:

$B_0'B_0\oplus DB_0'$ here D represents the delay of one symbol time.

Figure 5:
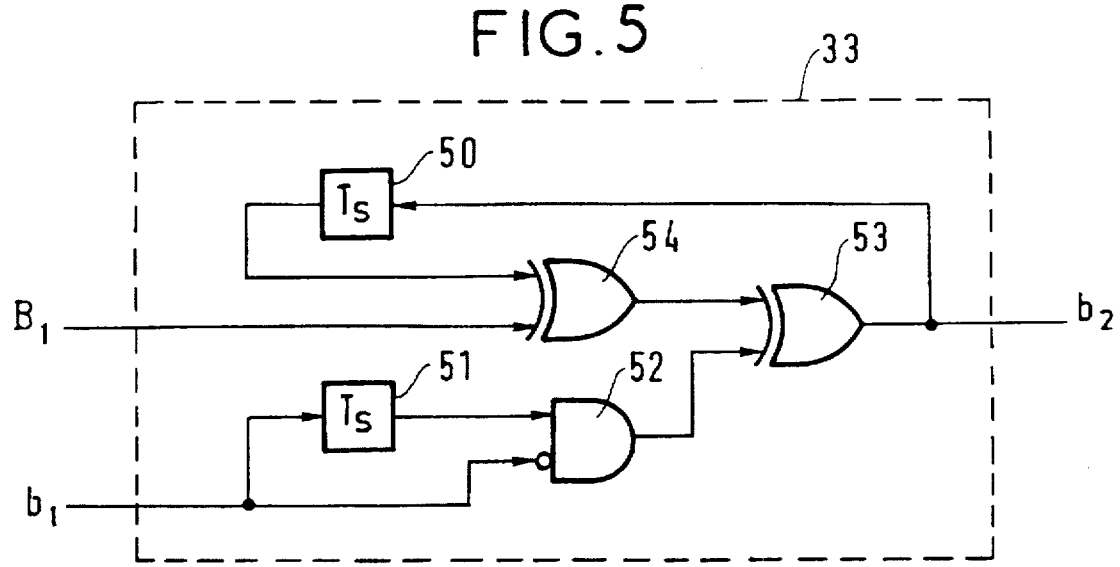
FIG. 5 shows an embodiment of the two-input differential coder of FIG. 3.

FIG. 5 shows an embodiment of the differential coder 33 of FIG. 3.

The differential coder 33 receives the bits $B_1$ and $b_1$. The bit $b_1$ is applied to the inverting input of an AND gate 52 and to an input of a bistable 51 controlled at the symbol rate $T_s$. The output from the bistable 51 is applied to the other input of the AND gate 52. The output of the AND gate 52 is connected to one of the inputs of an exclusive-OR gate 53. The bit $B_1$ is applied to one of the inputs of an exclusive-OR gate 54 whose output is connected to the other input of the exclusive-OR gate 53. At each symbol time, the output of the exclusive-OR gate 53 delivers a bit $b_2$ which is looped back to the other input of the exclusive-OR gate 54 via a bistable 50, likewise controlled at the symbol rate $T_s$.

The bit $b_2$ is equal to:

$$b_2 = B_1 \oplus Db_2 \oplus (\overline{b_1} * Db_1)$$

Figure 6:
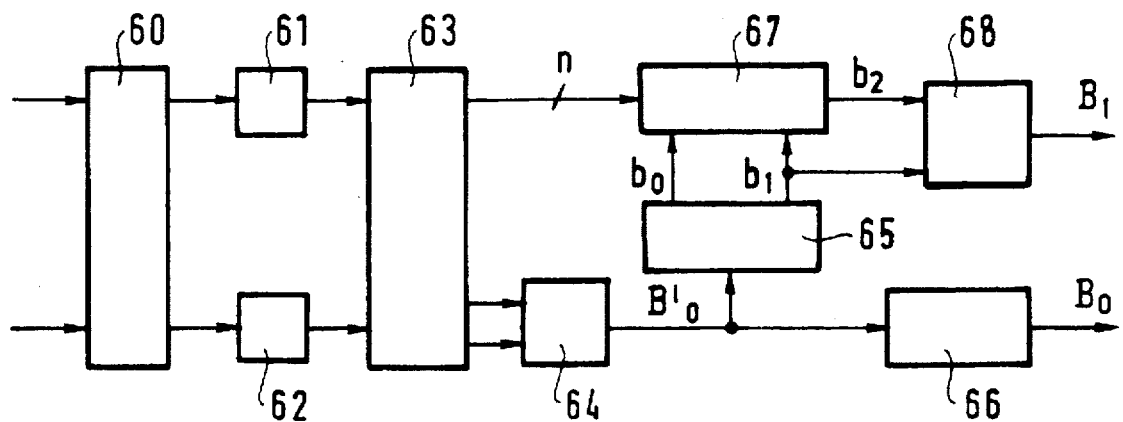
FIG. 6 is a block diagram of a decoder system of the invention designed to decode the signals from the FIG. 3 coder.

The decoding system shown in FIG. 6 is designed to be integrated in a receiver of symbols that have been coded in compliance with FIG. 3. It comprises a tuned filter 60 receiving the complex envelope of the demodulated signal in baseband and delivering two filtered signals to digital-to-analog converters 61 and 62 controlled at the symbol time. A decoder 63 for decoding pairs of sectors, commonly referred to as a "subset decoder", receives the digitized signals. The subset decoder 63 operates with flexible decision-making, i.e. with weighted decision-making. It provides information on n bits, where n is equal to 6, for example, to a demapping unit 67, specifying the subset in which the received coded signal lies. Four subsets are possible:

I—[0°, 45°[∪[180°, 225°[

II—[45°, 90°[∪[225°, 270°[

III—[90°, 135°[∪[270°, 315°[

IV—[135°, 180°[∪[315°, 0°[

With reference to FIG. 1, pairs of sectors are therefore as follows: I corresponds to the sectors 1 and 5; II to sectors 2 and 6; III to sectors 3 and 7; and IV to sectors 4 and 0. It may be observed that this constellation does not correspond to that used by the Q1875 circuit since no coded symbols lie on the I and Q axes.

Each subset I to IV thus corresponds to a set of two possible points of the constellation, these points being 180° apart. It may be observed that the subsets I to IV are determined solely by the two less significant bits $b_1$ and $b_0$.

The subset decoder 63 is also connected to a Viterbi decoder 64 which performs decoding on the maximum likelihood criterion. At each symbol time, it provides a bit $B_0'$ identical to that delivered by the coder 30 in FIG. 3. The digital output train from the decoder 64 is a sequence of subsets closest to the received samples (minimum distance between each received sample and two opposite points). The bit $B_0'$ is applied to a one-input differential decoder 66 and to a convolutional coder 65 identical to the coder 31 of FIG. 3 (ratio ½ and constraint length 7). The coder 65 optionally includes a de-puncturing device if a puncturing device 32 is used in coding. The coder 65 delivers two bits $b_0$ and $b_1$ at each symbol time to the demapping unit 67, with the bit $b_1$ also being applied to a two-input differential decoder 68. The demapping unit 67 performs a function that is the inverse of the function performed by the mapping unit 34 of FIG. 3, and it delivers the bit $b_2$ to the differential decoder 68. The differential decoder delivers reconstituted bit $B_1$.

Figure 7:
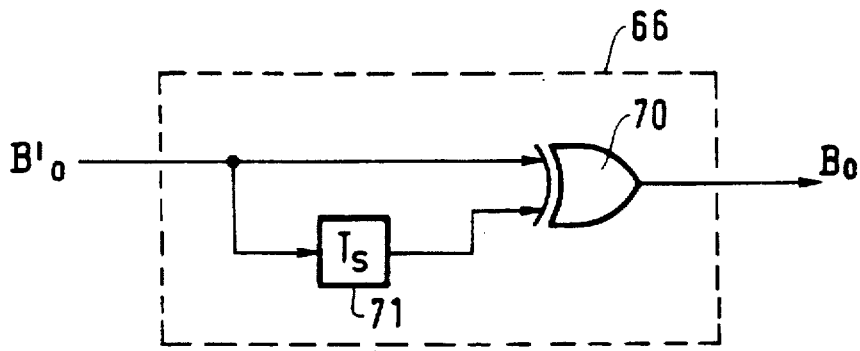
FIG. 7 shows an embodiment of the one-input differential decoder of FIG. 6.

FIG. 7 shows an embodiment of the one-input differential decoder 66 of FIG. 6.

This differential decoder receivers the bit $B_0'$ from the Viterbi decoder and it delivers the bit $B_0$. It comprises an exclusive-OR gate 70 having one input receiving the bit $B_0'$ and having its other input receiving the same bit after being delayed by one symbol time by a bistable 71.

This circuit provides: $B_0 = B_0' \oplus DB_0'$.

Figure 8:
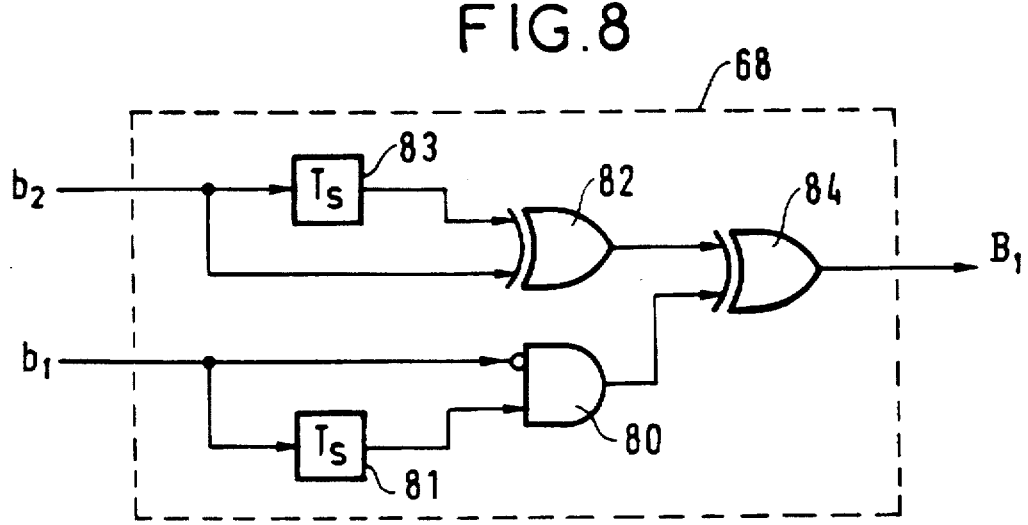
FIG. 8 shows an embodiment of the two-input differential decoder of FIG. 6.

FIG. 8 shows an embodiment of the two-input differential decoder 68 of FIG. 6.

The bit $b_1$ is applied to an inverting input of an AND gate 80, whose other input receives the bit $b_1$ delayed by one symbol time by a bistable 81. The output of the AND gate 80 is applied to an input of an exclusive-OR gate 84. The bit $b_2$ is applied to an input of an exclusive-OR gate 82, whose other input receives the bit $b_2$ as delayed by one symbol time by a bistable 83. The output of the exclusive-OR gate 82 is connected to the other input of the exclusive-OR gate 84. The output of gate 84 constitutes the bit $B_1$.

The differential decoder 68 delivers $B_1$ on the basis of $b_1$ and $b_2$ in application of the following relationship:

$$B_1 = b_2 \oplus Db_2 \oplus (\overline{b_1} * Db_1)$$

The coder 65 and the demapping unit 67 serve to lift the ambiguity on the sector in which the received symbol lies. The recoding of $b_0$ and $b_1$ thus serves to identify the most likely sector, i.e. that one of the 8 sectors shown in FIG. 1 in which the received symbol lies. The demapping unit 67 delivers $b_2$ as a function of the subsets I to IV (values of $b_0$ and $b_1$) in application of the following table:

|        |   | | | Sector | | | | |
|--------|---|---|---|---|---|---|---|---|
| $b_1b_0$ | 0 | 1 | 2 | 3 | 4 | 5 | 6 | 7 |
| 00     | 0 | 0 | 0 | 1 | 1 | 1 | 1 | 0 |
| 01     | 0 | 0 | 0 | 0 | 1 | 1 | 1 | 1 |
| 10     | 1 | 1 | 0 | 0 | 0 | 0 | 1 | 1 |
| 11     | 1 | 0 | 0 | 0 | 0 | 1 | 1 | 1 |

By way of example, if $b_1b_0$ is 01 and the decoded sector is the sector referenced 3 in FIG. 1, $b_2$ is zero.

Simulation performed in the laboratory has shown that the coding and decoding systems described above make it possible to eliminate phase ambiguities of ±90° and of 180°. They are also of a structure that is simpler than that used in the Q1875 pragmatic decoder circuit, while not being limited in processing speed.

The invention is particularly applicable to systems for transmitting images at high rate over a radio link.

I claim:

1. A differential coder/decoder system for trellis-coded 8-PSK modulation, said coder system being of the type designed, at each symbol time $(T_s)$, to convert a two-bit information symbol $B_1B_0$ into a three-bit coded symbol $b_2b_1b_0$, said coder system including a one-input differential coder (30) receiving, at each symbol time $(T_s)$, a first $(B_0)$ of the bits of said information symbol $(B_1B_0)$ and supplying, at each symbol time $(T_s)$, a differentially coded bit $(B_0')$ to a convolutional coder (31) of the G=(171, 133) type having a ratio of ½ and a constraint length of 7, which delivers two coded bits $(b_1b_0)$ of said coded symbol $(b_2b_1b_0)$, said differential coder/decoder system being characterized in that it further includes a two-input differential coder (33) receiving one of said bits $(b_1)$ from said convolutional coder (31) on a first of its inputs and the second $(B_1)$ of the bits of said information symbol $(B_1B_0)$ on a second of its inputs, said two-input differential coder (33) providing, at each symbol time ($T_s$), an output bit ($b_2$) constituting the third of the bits of said coded symbol ($b_2b_1b_0$), said third bit ($b_2$) being equal to:

$$b_2 = B_1 \oplus Db_2 \oplus (\overline{b_1} * Db_1)$$

where $b_2$ is said output bit from said two-input differential coder (33), $B_1$ is the second of the bits of said information symbol ($B_1B_0$), D is a one symbol time delay, and $b_1$ is said bit applied to said first of the inputs of said two-input differential coder (33), said one-input differential coder (30) providing a differentially coded bit $B_0'$ equal to:

$$B_0' = B_0 \oplus DB_0'$$

where $B_0$ is said first bit of said information symbol ($B_1B_0$), and in that said decoder system includes firstly a one-input differential decoder (66) receiving said differentially coded bit ($B_0'$) and providing said first bit ($B_0$) of said information symbol ($B_1B_0$) in application of the relationship:

$$B_0 = B_0' \oplus DB_0'$$

and secondly a two-input differential decoder receiving said bits $b_1$ and $b_2$ of said coded symbol and providing said second bit ($B_1$) of said information symbol ($B_1B_0$) in application of the relationship:

$$B_1 = b_2 \oplus Db_2 \oplus (\overline{b_1} * Db_1).$$

2. A coding/decoding system according to claim 1, characterized in that said decoder system includes a subset decoder (63) followed by a Viterbi decoder (64) and by a demapping unit (67) designed to lift the ambiguity on the subset (I to IV) in which the received symbol lies, said Viterbi decoder (64) providing said differentially coded bit ($B_0'$) to said one-input differential decoder (66), said Viterbi decoder (64) being connected to a coder (65) of the G=(171, 133) type having a ratio of ½ and a constraint length of 7 which provides two reconstituted coded bits ($b_1b_0$) of said coded symbol ($b_2b_1b_0$) to said demapping unit (67).

3. A differential coder/decoder system for trellis-coded 8-PSK modulation, said coder system being of the type designed, at each symbol time ($T_s$), to convert a two-bit information symbol $B_1B_0$ into a three-bit coded symbol $b_2b_1b_0$, said coder system including a one-input differential coder (30) receiving, at each symbol time ($T_s$), a first ($B_0$) of the bits of said information symbol ($B_1B_0$) and supplying, at each symbol time ($T_s$s), a differentially coded bit ($B_0'$) to a convolutional coder (31) of the G=(171, 133) type having a ratio of ½ and a constraint length of 7, which delivers two coded bits ($b_1b_0$) of said coded symbol ($b_2b_1b_0$), said differential coder/decoder system being characterized in that it further includes a two-input differential coder (33) receiving one of said bits ($b_1$) from said convolutional coder (31) on a first of its inputs and the second ($B_1$) of the bits of said information symbol ($B_1B_0$) on a second of its inputs, said two-input differential coder (33) providing, at each symbol time ($T_s$), an output bit ($b_2$) constituting the third of the bits of said coded symbol ($b_2b_1b_0$), said third bit ($b_2$) constituting the third of the bits of said coded symbol ($b_2b_1b_0$), said third bit ($b_2$) being equal to:

$$b_2 = B_1 \oplus Db_2 \oplus (\overline{b_1} * Db_1)$$

where $b_2$ is said output bit from said two-input differential coder (33), $B_1$ is the second of the bits of said information symbol ($B_1B_0$), D is a one symbol time delay, and $b_1$ is said bit applied to said first of the inputs of said two-input differential coder (33), said one-input differential coder (30) providing a differentially coded bit $B_0'$ equal to:

$$B_0' = B_0 \oplus DB_0'$$

where $B_0$ is said first bit of said information symbol ($B_1B_0$).

4. A differential decoder system for trellis-coded 8-PSK modulation for converting a three-bit coded symbol ($b_2b_1b_0$) into a two-bit information symbol ($B_1B_0$), including:

a one-input differential decoder (66) receiving a differentially coded bit ($B_0'$) and providing a first bit ($B_0$) of said information symbol ($B_1B_0$) in application of the relationship:

$$B_0 = B_0' \oplus DB_0'$$

where D is a one symbol time delay; and a two-input differential decoder receiving second ($b_1$) and third ($b_2$) bits of said coded symbol and providing said second bit ($B_1$) of said information symbol ($B_1B_0$) in application of the relationship:

$$B_1 = b_2 \oplus Db_2 \oplus (\overline{b_1} * Db_1).$$

5. A differential encoder system for trellis-coded 8-PSK modulation for converting a two-bit input symbol $B_1B_0$ into a three-bit encoded symbol ($b_2b_1b_0$) at each symbol-time comprising:

a one-bit differential encoder for differentiating a binary change of a first bit $B_0$ of the two-bit input symbol, between successive symbol-times, and producing a change indication output ($B_0'$), having its output connected to a convolutional encoder, said convolutional encoder generating a first bit ($b_0$) and a second bit ($b_1$) of said three-bit encoded symbol, and a two-bit differential encoder for differentiating symbol changes by producing a third bit ($b_2$) of said three-bit encoded symbol ($b_2b_1b_0$) based on the equation:

$$b_2 = B_1 \oplus Db_2 \oplus (\overline{b_1} * Db_1),$$

where $b_2$ is the third bit of said three-bit encoded symbol, $B_1$ is a second bit of the two-bit input symbol, $b_1$ is the second bit of the three-bit encoded symbol, $Db_1$ is the previous symbol-time state of $b_1$, and $Db_2$ is the previous symbol-time state of the third bit of said three-bit encoded symbol.

6. A differential decoder system for trellis-coded 8-PSK modulation for converting a differentially encoded three-bit input symbol of a received signal into a two-bit output symbol at each symbol time comprising:

a one-bit differential decoder producing a first information output bit ($B_0$) which indicates a binary change between an immediately previous symbol-time state ($DB_0'$)of a first differentially encoded input bit and a present first differentially encoded input bit ($B_0$); and a two-bit differential decoder producing a second information output bit ($B_1$) based on the equation:

$$B_1 = b_2 \oplus Db_2 \oplus (\overline{b_1} * Db_1),$$

where $B_1$ is the second decoded output symbol bit, $b_2$ and $b_1$ are a second and third differentially encoded input bits, and $Db_2$ and $Db_1$ are the previous symbol-time states of $b_2$ and $b_1$, respectively.

7. A differential encoder for 8-PSK comprising:

an encoder which, for each symbol time, encodes a series of previous and present two-bit input symbols ($B_1B_0$)

into a series of previous and present three-bit output symbols ($b_2b_1b_0$), said encoder including:

a means for differentially encoding a first bit of the previous two-bit input symbol ($Db_0$) with respect to a first bit of the present two-bit symbol ($b_0$), generating an output bit to a means for convolutional encoding said output bit, producing a first and second bit ($b_1b_0$) of the present three-bit output symbol, and a means for differentially encoding a third bit ($b_2$) of the present three-bit output symbol, based upon said second output bit of the previous three-bit output symbol ($Db_1$), the second bit of the present three-bit output symbol ($b_1$), and the second bit of the present two-bit input symbol ($B_1$), based upon the equation:

$$b_2 = B_1 \oplus Db_2 \oplus (\overline{b_1} * Db_1)$$

where $b_2$ is the third bit of the present three-bit output symbol, $B_1$ is the second input bit of the present two-bit input symbol, $b_1$ is the second bit of the present three-bit output symbol, and $Db_1$ and $Db_2$ are the previous symbol-time states of $b_1$ and $b_2$, respectively.

* * * * *